United States Patent
Bosley

(10) Patent No.: US 6,656,352 B2
(45) Date of Patent: Dec. 2, 2003

(54) SEAWATER PRESSURE-DRIVEN DESALINIZATION APPARATUS AND METHOD WITH GRAVITY-DRIVEN BRINE RETURN

(76) Inventor: Kenneth R. Bosley, 634 NE. Country Club Ave., Fort Walton Beach, FL (US) 32547

( * ) Notice: Subject to any disclaimer, the term of this patent is extended or adjusted under 35 U.S.C. 154(b) by 0 days.

(21) Appl. No.: 10/036,433

(22) Filed: Jan. 7, 2002

(65) Prior Publication Data

US 2002/0125190 A1 Sep. 12, 2002

Related U.S. Application Data

(60) Division of application No. 09/716,230, filed on Nov. 21, 2000, now Pat. No. 6,348,148, which is a continuation-in-part of application No. 09/287,658, filed on Apr. 7, 1999, now abandoned.

(51) Int. Cl.[7] .............................................. B01D 63/00
(52) U.S. Cl. ...................... 210/170; 210/650; 210/651; 210/652; 210/257.2
(58) Field of Search ................................. 210/170, 652, 210/651, 650, 257.2, 195.1, 641

(56) References Cited

U.S. PATENT DOCUMENTS

| | | | | |
|---|---|---|---|---|
| 3,171,808 A | * | 3/1965 | Todd | 203/DIG. 17 |
| 3,456,802 A | * | 7/1969 | Cole | 203/DIG. 17 |
| 5,366,635 A | * | 11/1994 | Watkins | 210/170 |
| 5,916,441 A | * | 6/1999 | Raether | 210/136 |

* cited by examiner

*Primary Examiner*—W. L. Walker
*Assistant Examiner*—K S Menon
(74) *Attorney, Agent, or Firm*—Stephen Christopher Swift; Swift Law Office

(57) ABSTRACT

An apparatus and method of removing salt from seawater to produce potable freshwater. In the first preferred embodiment, a reverse osmosis system containing one or more reverse osmosis devices ("RODs") is supported by a platform on the sea floor. In the second preferred embodiment, a cylinder is supported by a flotation device, and the reverse osmosis system is retained on the cylinder. In both the embodiments, an elongated brine return runs downhill on the sea floor. The RODs each contain a membrane that will allow water molecules, but not sodium and chlorine ions, to pass through. Due to the pressure differential, freshwater passes through the membranes by reverse osmosis, and is pumped out of the pressure hulls to a storage facility onshore.

10 Claims, 2 Drawing Sheets

SEAWATER PRESSURE-DRIVEN DESALINIZATION APPARATUS AND METHOD WITH GRAVITY-DRIVEN BRINE RETURN

CROSS REFERENCE TO RELATED APPLICATION

This application is a Divisional Application of Utility patent application Ser. No. 09/716,230, filed Nov. 21, 2000 now U.S. Pat. No. 6,348,148, which was a Continuation-In-Part of Utility patent application Ser. No. 09/287,658, filed Apr. 7, 1999 now abandoned.

BACKGROUND OF THE INVENTION

1. Field of the Invention

The present invention relates to a reverse osmosis method of removing the salt from water in the ocean or inland bodies of salt water, using the pressure of the seawater itself, and the force of gravity.

2. Description of the Prior Art

Due to the shortage of freshwater in the southwestern United States and other arid parts of the world, there have been numerous inventions for desalinating sea water, by reverse osmosis, distillation, and other means. However, desalinization remains an expensive process. The concentrated brine produced as a by-product of desalinization can itself contribute to pollution of the environment in onshore facilities. The production of electricity or other forms of energy consumed in desalinization can also contribute to pollution of the air, water and land.

U.S. Pat. No. 3,171,808, issued on Mar. 2, 1965, to Henry W. Todd, discloses an apparatus for extracting fresh water from ocean salt water, using vanes that are not included in the present invention.

U.S. Pat. No. 3,456,802, issued on Jul. 22, 1969, to Marc Cole, discloses an apparatus for desalinization by submerged reverse osmosis, without the gravity-driven brine return of the present invention.

U.S. Pat. No. 4,125,463, issued on Nov. 14, 1978, to James W. Chenoweth, discloses a reverse osmosis desalinization apparatus and method, that is placed in a well hole for desalinating salty ground water.

U.S. Pat. No. 4,335,576, issued on Jun. 22, 1982, to Harold H. Hopfe, discloses a device for producing freshwater from seawater which floats on the surface of the sea. It derives the energy for desalinization from the motion of the waves on the surface of the water. Movement of the water on the surface causes reaction plates to move, and the movement is ultimately transmitted to pistons that move in cylinders to exert pressure on seawater to force reverse osmosis.

U.S. Pat. No. 4,452,969, issued on Jun. 5, 1984, to Fernand Lopez, discloses a reverse osmosis apparatus for producing freshwater from seawater, which is designed to be temporarily submerged, as on a fishing line. U.S. Pat. No. 4,770,775, issued on Sep. 13, 1988, to Fernand Lopez, discloses another apparatus for the production of freshwater from seawater, which is also designed to be temporarily submerged, and has a chamber that expands as freshwater is produced. Both of these apparatuses use the pressure of the seawater itself to force reverse osmosis.

U.S. Pat. No. 5,167,786, issued on Dec. 1, 1992, to William J. Eberle, discloses a wave power collection apparatus, which is anchored in the sea floor, and in one embodiment desalinates seawater by reverse osmosis. The movement of floats is used in that embodiment to turn a generator which produces electricity to power pumps that force seawater through a membrane in a reverse osmosis unit.

U.S. Pat. No. 5,229,005, issued on Jul. 20, 1993, to Yu-Si Fok and Sushil K. Gupta, discloses a process for the desalinization of seawater, by lowering reverse osmosis devices into the ocean by means of lines attached to pulleys, and raising them again by the same means to remove the freshwater produced. The pressure of the seawater itself is used to force reverse osmosis of the seawater across a membrane to produce freshwater.

U.S. Pat. No. 5,366,635, issued on Nov. 22, 1994, to Larry O. Watkins, discloses a desalinization apparatus and means in which a separator is placed on the sea floor, and the pressure at the sea floor is used to force seawater through a membrane to form freshwater by reverse osmosis, which is then pumped out.

U.S. Pat. No. 5,914,041, issued on Jun. 22, 1999, to Dennis H. Chancellor, discloses channel based reverse osmosis, in which reverse osmosis units are placed within a deep channel. The channel contains unpurified liquid (such as salt water) at a level such that the pressure across the membranes of the reverse osmosis units causes purified liquid (such as fresh water) to accumulate in cavities in the reverse osmosis units, from which it is emptied and pumped to the surface.

U.S. Pat. No. 5,916,441, issued on Jun. 29, 1999, to Roger J. Raether, discloses an apparatus for desalinating salt water in a mine shaft.

U.S. Pat. No. 5,944,999, issued on Aug. 31, 1999, to Dennis H. Chancellor, Marc Chancellor and Jacquetta M. Vogel, discloses a modular filtration system, in which the weight of the fluid being filtered is used to drive the filtration process.

British Patent No. 2,068,774, published on Aug. 19, 1981, to Jose Luis Ramo Mesple, discloses an apparatus for desalinating water by reverse osmosis in cells located deep underground, utilizing the pressure resulting from the water being deep underground.

The *Osmotic Pump,* by Octave Levenspiel and Noel de Nevers, Science, January 1974, Volume 183, Number 4121, pages 157–160, discloses the idea of using the weight of sea water to drive a desalinization process, but does not disclose the structures and mechanisms of the present invention.

The present invention is distinguishable from the prior art cited, in that only it takes advantage of the fact that the concentrated brine produced as a by-product of reverse osmosis desalinization is heavier than seawater to reduce the energy consumed in desalinization, by means of a gravity-driven brine return. None of the above inventions and patents, taken either singly or in combination, will be seen to describe the present invention as claimed.

SUMMARY OF THE INVENTION

The present invention is an apparatus and method of removing salt from seawater to produce potable freshwater. In the first preferred embodiment, a reverse osmosis system containing one or more reverse osmosis devices ("RODs") is supported by a platform on the sea floor. In the second preferred embodiment, the cylinder is supported by a flotation device, and the reverse osmosis system is retained on a cylinder. In both the embodiments, an elongated brine return runs downhill on the sea floor. The RODs each contain a membrane that will allow water molecules, but not sodium and chlorine ions, to pass through. Check valves allow sea water to pass from outside the reverse osmosis system into the RODs. Due to the pressure differential, water molecules pass through the membranes by reverse osmosis, while salt is left behind, and freshwater is pumped out of the pressure hulls to a storage facility on shore (or where ever else it is needed).

Accordingly, it is a principal object of the invention to provide a means for reducing the energy required to desalinate seawater. Conventional desalinization plants, located on or near the seashore, require four pumping processes: first, pumping the seawater to the plant; second, pumping to raise the pressure high enough for the RODs to operate; third, pumping the brine back out to sea; and fourth, pumping the freshwater to a reservoir or a treatment facility for further purification, and ultimately to the consumer. The present invention eliminates all but the fourth pumping process. While prior inventions of offshore desalinization apparatus, as in U.S. Pat. No. 5,366,635 to Watkins, will also eliminate the first and second processes, only the instant invention will also eliminate the third process of pumping out the brine, without requiring that energy be expended in raising the RODs, as in U.S. Pat. No. 4,452,969 to Lopez and U.S. Pat. No. 5,229,005 to Fok et al.

It is second object of the invention to provide a means for reducing the need for using expensive real estate on or near the oceanfront for desalinization facilities. As no oceanfront or near-oceanfront property is used exclusively for the process, most real estate costs associated with desalinization plants can be avoided. Some offshore site leasing may be required, but this cost should be much lower than for offshore sites involved in petroleum or mineral extraction.

It is a third object of the invention to provide a means for making the expansion of desalinization facilities easier and less expensive. As each platform must have a clear navigation zone around it (as most jurisdictions require by law), sufficient space for attaching additional pressure hulls to the cylinder will be available and facility expansion considerably eased. The expansion of a facility is limited only by the number of pressure hulls that can be fitted onto the cylinder at appropriate depths, rather than allowances made by a zoning commission with many other constituents to satisfy, as may the case with a land-based desalinization facility.

It is a fourth object of the invention is to provide a means for reducing the cost of desalinizing seawater by centralizing maintenance facilities, as the pressure hulls can be removed and taken to a central facility for maintenance, rather than the on-site maintenance required by conventional shore-based desalinization plants.

It is a fifth object of the invention to reduce pollution of the shoreline from the release of concentrated brine by desalinization plants. Conventional onshore desalinization facilities pump their brine out to sea through a bottom-laid pipeline, which releases the brine on or near the ocean floor. Releasing the brine near the ocean floor increases the area affected by the brine's toxicity. Existing methods to reduce the toxic effects add to the cost of desalinization through greater plant infrastructure requirements or reduced process efficiency. The present invention allows an offshore desalinization facility to release its brine into mid-water, where mixing with the ocean current is more efficient, with fewer effects upon bottom-dwelling flora and fauna. Because the facility can be located offshore, ocean currents and tidal action will thoroughly mix the brine back into the surrounding seawater, and the overall impact of increased salinity from the brine release could be infinitesimal as little as two or three kilometers down-current.

It is an object of the invention to provide improved elements and arrangements thereof in an apparatus for the purposes described which is cost effective, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is an apparatus and method of removing salt from seawater to produce potable fresh water. It may be used in either the oceans or in inland bodies of salt water.

Figure 1:
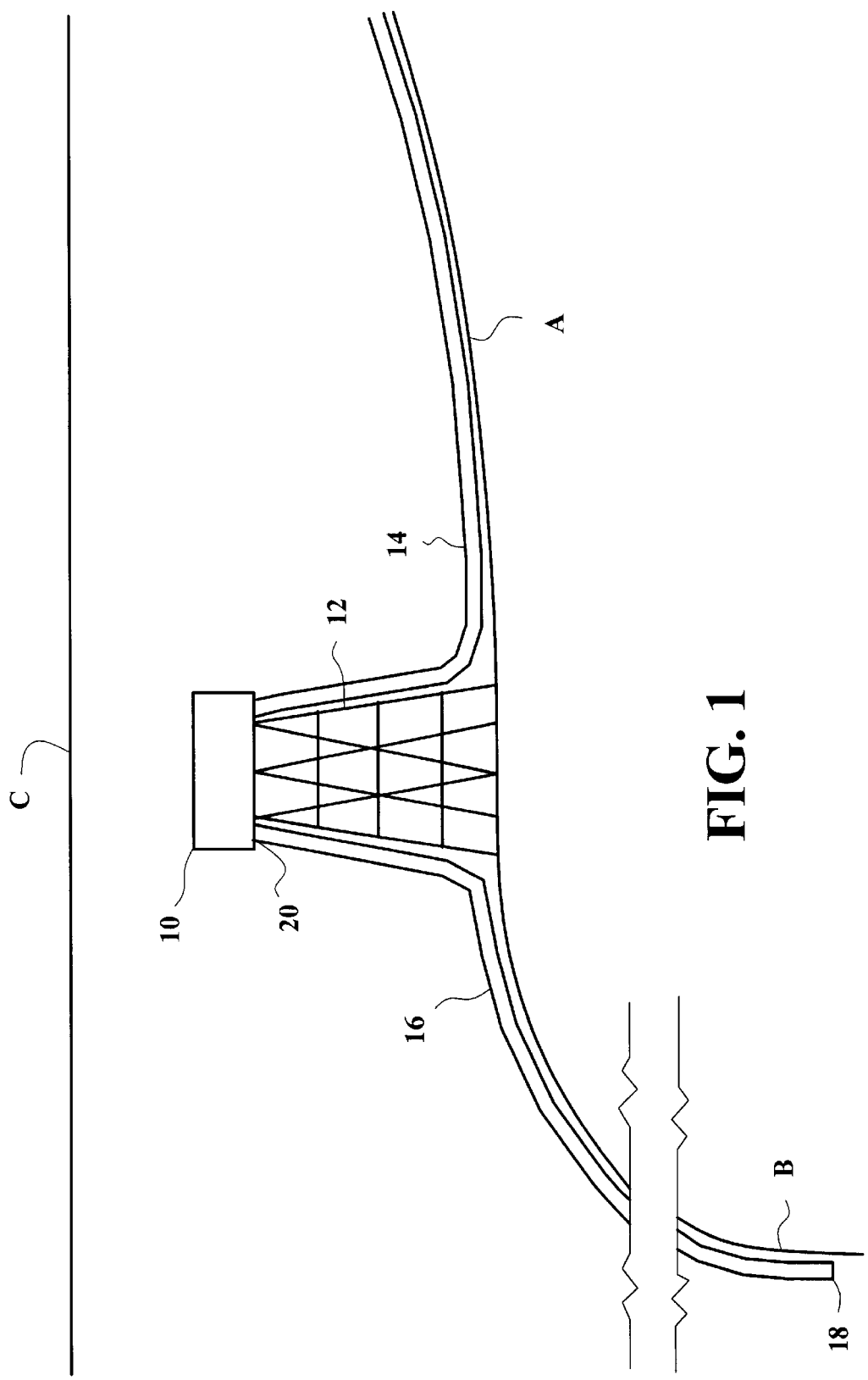
FIG. 1 is a schematic environmental front elevational view of the first preferred embodiment of the invention.

FIG. 1 is a schematic environmental front elevational view of the first preferred embodiment of the invention, in which a single reverse osmosis system 10 is elevated above the sea floor A by a platform 12. The reverse osmosis system has an external skin and contains on or more reverse osmosis devices ("RODs") (not shown in the drawings). The RODs each having a selectively permeable membrane surrounding a brine enclosure. The membrane allows water molecules, but not sodium and chlorine ions, to pass through. (Other substances may also be filtered out of the seawater, depending on the characteristics of the membrane.) A seawater inlet (not shown in the drawings) allows water to pass into the reverse osmosis system after passing through a screen for fish and large matter, a pre-filter for silt and particulate matter, a micro-filter for bacteria and suspended solids, and a check valve. Desalinated water is removed from the fresh water enclosures of the RODs through a fresh water return 14 by at least one fresh water pump (not shown in the drawings) which may be located in the reverse osmosis system, along the fresh water return, or on shore. Water having an increased concentration of salt is removed from the brine enclosures of the RODs through a brine return 16. As shown in FIG. 1, the brine return passes down the platform, over the sea floor, and has an outlet 18 where the brine is released into the surrounding seawater, preferably at a considerable distance (as indicated by the pair of jagged lines) from the reverse osmosis system (so that the brine does not soon become mixed back in with the seawater being desalinated) and over an undersea cliff B or other area of the sea floor having a lower elevation the sea floor on which the platform rests. The reverse osmosis system is located far enough below the surface of the sea C that the weight of the overlying sea water creates sufficient pressure for reverse osmosis to occur across the membranes in the RODs. A pressure differential is maintained across the membranes by the fresh water pumps. Initially, the brine is pumped out of the brine enclosures by a brine pump (not shown in the drawings) until the brine return is filled (or "charged") with brine. Then the brine pump can be turned off, while the inlet 20 of the brine return remains open, and the brine will continue to flow downhill through the brine return under the force of gravity, because it is heavier than the surrounding seawater. This saves the energy that would otherwise be needed to pump out the brine. (Note that the weight of the brine in the brine return, and the drop in depth from the brine return's inlet to its outlet, must be great enough that the downward pressure of the brine under the force of gravity exceeds the back pressure across the membranes in the RODs that is maintained by the fresh water pump.)

Figure 2:
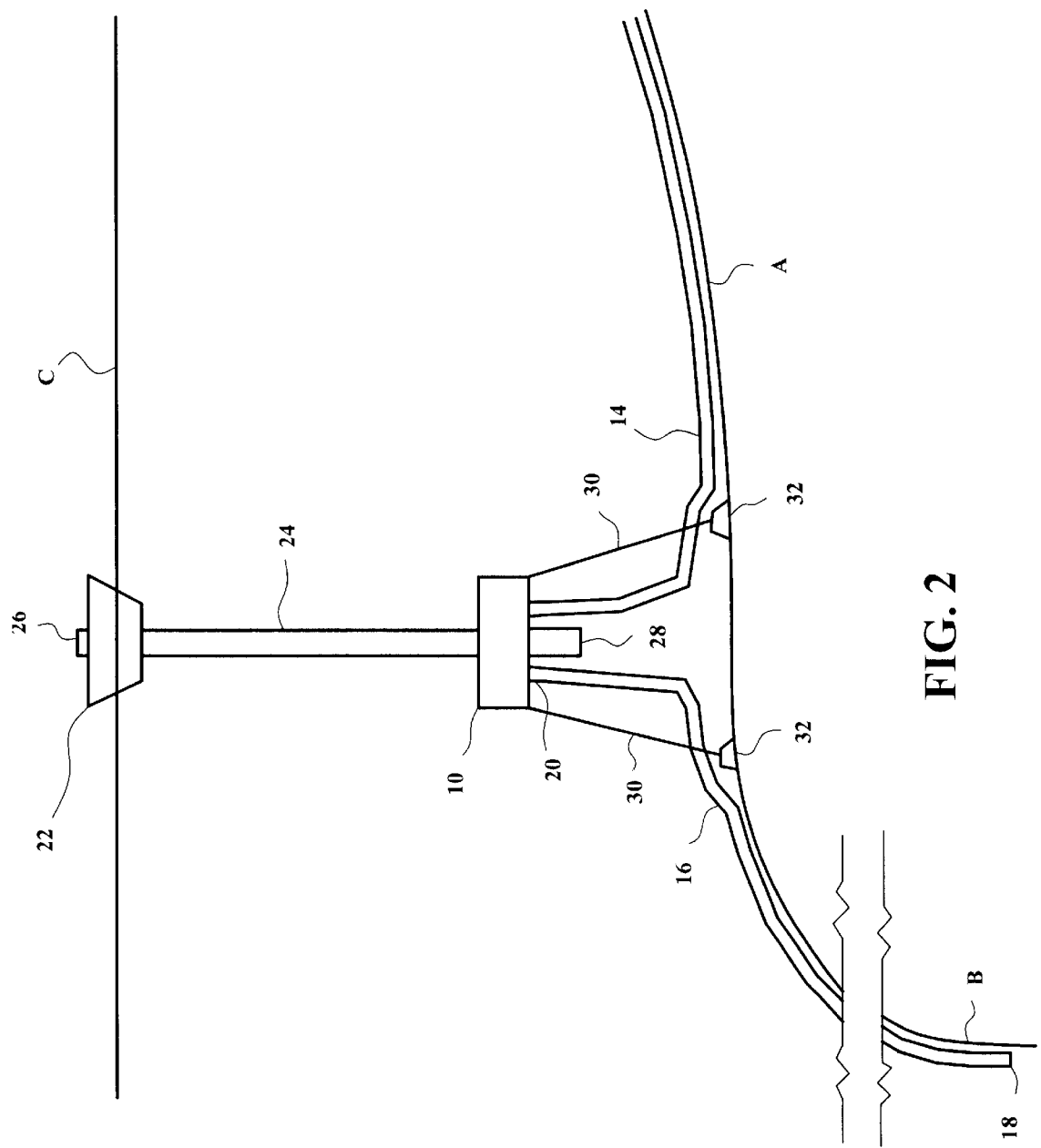
FIG. 2 is a schematic environmental front elevational view of the second preferred embodiment of the invention.

FIG. 2 is a schematic environmental front elevational view of the second preferred embodiment of the invention, which is similar to the first preferred embodiment, except that rather than being supported by a platform on the floor, it is supported by a flotation device 22 on the surface of the sea. A channel 24, which is preferably a hollow vertical cylinder with an open top 26 and a closed bottom 28, is retained on the flotation device, and the reverse osmosis system 10 is retained on the channel below the flotation device. The top of the channel passes above the surface of the sea. The reverse osmosis system is held in place by lines 30 connected to anchors 32 in the sea floor. Rather than being pumped directly into the brine return, brine is pumped into the channel through an outlet (not shown in the drawings) of the brine enclosures. The inlet of the brine return is connected to the channel, so that brine can then flow from the channel into the brine return. Once both the channel and the brine return are filled with brine, the brine pump can be turned off, while the outlet of the brine enclosures remains open, and brine will continue to flow out through the brine return, as in the first preferred embodiment. Because the brine is denser than the surrounding seawater, the surface of the brine in the channel will be below the surface of the sea, and it will have an increased pressure gradient (i.e., the pressure of the brine will increase more rapidly over a shorter vertical distance than the pressure of the seawater). This has the consequence that the channel can (and should) be positioned in relation to the reverse osmosis systems in such a manner that the pressure in the channel is less than the pressure in the brine enclosures in the RODs, thus causing the brine to flow out from the RODs into the channel, and from the channel out through the brine return.

The earth's gravity will cause the brine in the channel to flow out of the bottom opening until the weight of the brine in the channel equals the weight of an equivalent column of water in the sea outside the channel. As brine continually flows into the channel when the invention is in operation, the weight of the brine in the channel will continue to be heavier than that an equivalent column of seawater outside, and brine will continue to flow out. If there were no currents in the sea, the salinity of the sea in the immediate area around the channel could eventually rise to almost the degree of salinity in the channel (though not to complete equality, due to diffusion of salt through the seawater). This would cause the level of brine in the channel to rise to almost the level of the sea outside the channel, and it would be necessary to reactivate the brine pumps for desalinization to continue. (This might actually happen in inland bodies of salt water, which lack drainage to the oceans, if desalinization were carried out on a massive scale over a long period of time.) Thus, the present invention derives its energy savings, not out of nothing, as would a perpetual motion machine, but from the force of the earth's gravity, from ocean currents land interlayer mixing that are driven by electromagnetic radiation produced by nuclear reactions in the sun, and from diffusion made possible by random movements of molecules and ions in the seawater that are also driven by heat from the sun.

It is to be understood that the present invention is not limited to the embodiments described above, but encompasses any and all embodiments within the scope of the following claims.

MATHEMATICAL APPENDIX

The Power Advantage Of an "At-Depth" Desalinization Plant Versus A Shore-Based Plant Assumptions are as follows:
1. Both plants produce the same quantities of desalinated water.
2. The product water arrives at shore at the same pressure.
3. There is a method to return the brine (effluent) to the ocean.
4. The internal process is the same, the only difference in the facilities is the location.
5. The process requires a delta pressure of 850 psi across the element.
6. The pressure loss through the tube side, brine side (effluent), is 35 psi.
7. The process produces about a 30% yield of product, i.e. De-salinated water.
8. For simplicity the production will be based on 1 $m^3$ per second.

Calculations basic to both processes:
  Product=1 $m^3$/s therefore the initial supply of seawater=1 $m^3$/s/.3=3.33 $m^3$/s
  And by difference the effluent of brine=2.33$m^3$/s
  As an approximation, 1 $m^3$/s water requires about 6.9 kW to raise the pressure by 1 psi.

I. Analysis of a typical shore based facility is as follows. It will be assumed that the shore-based facility can recapture enough excess energy from the effluent to do all auxiliary pumping and to overcome frictional losses. Also to be conservative it is assumed that frictional forces of the supply is so small as to be negligible. Therefore the entire energy cost will be assumed to be in pressurizing the supply, as follows:

$$3.33\ m^3/s \times 850\ psi \times 6.9\ kW/(psi \times m^3/s) = 19.5\ MW$$

II. Analysis of the "At-depth" plant will include a discussion of all pressure losses, since the process is streamlined and there is no excess energy from any part of the process. Only the desalinated (product) water need be pumped (pressurized) to the 850 psi level. The three parts to this equation are the effluent "make-up pressure", the product pumping, and the frictional losses due to the piping of the product to shore. The pipe can be sized to maintain a flow rate of about 1 m/s.

a. Product power requirement=850 psi×1 $m^3$/s×6.9 kW/(psi×$m^3$/s)=5.9 MW
  b. Effluent power requirement=35 psi×2.33 $m^3$/s×6.9 kW/(psi×$m^3$/s)=0.5 MW
  c. Power required to overcome frictional losses:
  friction loss=fluid density×coefficient of friction×length/diameter×velocity squared/2
  Re=fluid velocity×pipe diamet
  Re=1 m/s×0.56 m×1000 kg/m3/1000×$10^{-6}$ Pa s=5.6×$10^5$
  Relative Roughness=mean roughness/pipe diameter= 0.04 mm/0.56 m=7.1×$10^{-5}$
  And therefore from standard tables the Coefficient of friction is 0.014

Therefore the frictional loss is:

$$1000\ kg/m^3 \times 0.014 \times 11000\ m/0.56\ m \times (1\ m/s)^2/2 = 138{,}000\ m/kg\ s^2 - 138000\ Pa$$

138000 $Pa \times 1\ psi/6895\ Pa = 20\ psi$

And Frictional losses = $20\ psi \times 1\ m^3/s \times 6.9\ kW/(psi \times m^3/s)$ = 0.1 MW Therefore the total power requirement is:

5.9 MW + 0.5 MW + 0.1 MW = 6.5 MW or ⅓ of the shore system's 19.5 MW

Discussion:
1. Pumping efficiency was ignored for simplicity since the same inefficiencies would govern both systems equally and not change the statistical results.
2. For both systems the product required the entire 850 psi, therefore both systems have lost the 5.9 MW in forcing the separation process and it is non-recoverable.
3. The additional power required by the "at-depth" system is in adding "make-up pressure" to the effluent and overcoming frictional losses, together about 10% of the total power requirement.
4. The shore-based system pressurizes the entire supply to the 850 psi. More than 3 times the mass required by the "at-depth" system.
5. The "at-depth" system releases the effluent immediately at the end of the separation process, while the shore based system must return the effluent to a safe mixing zone with enough energy to ensure proper mixing, which requires more power.
6. If the shore based system were able to recycle as much as 50% of the "lost" power back into the system, then the "at-depth" system would still require only ⅔s as much power.

I claim:

1. An apparatus for desalinating seawater, consisting essentially of:
   at least one seawater inlet, located far enough below the surface of a body of salt water that pressure can power osmosis;
   at least one membrane through which water molecules can flow, but through which sodium and chlorine ions cannot flow;
   at least one fresh water enclosure, within which water that has been desalinated by passing through the membrane, can be collected and separated from salt water;
   at least one freshwater pump for removing desalinated water from the freshwater enclosure;
   at least one brine enclosure, within which water that has not passed through the membrane, and has an increased concentration of salt, can be collected and separated from water with a lower concentration of salt;
   at least one brine return having an inlet connected to the brine enclosure and an outlet lower in elevation than the brine enclosure, with the outlet located a sufficient distance from the seawater inlet to prevent the brine from soon mixing with the seawater being desalinated, and with the outlet located sufficiently far below the brine enclosure that brine will flow out through the brine return under the influence of gravity; and
   at least one initial charge brine pump downstream from the membrane for pumping brine out of the brine enclosure until the brine return is filled;
   wherein the brine pump can be turned on and turned off, and the inlet to the brine return is open when the brine pump is turned off, whereby water having an increased concentration of salt can continue to flow out through the brine return after the brine pump is turned off.

2. An apparatus for desalinating seawater according to claim 1, wherein the brine return is an elongated channel that passes along the sea floor, from an area where the sea floor has a higher elevation near the inlet of the brine return, to an area where the sea floor has a lower elevation near the outlet of the brine return, whereby the force of gravity will cause water having an increased concentration of salt to continue to flow through the brine return after the brine pump is turned off.

3. An apparatus for desalinating seawater according to claim 2, wherein the membrane, the fresh water enclosure, and the brine enclosure, are contained within a reverse osmosis system, and the reverse osmosis system is retained on a platform resting on the sea floor.

4. An apparatus for desalinating seawater according to claim 3, wherein the inlet has a screen and at least one filter through which seawater must pass before it can reach the membrane.

5. An apparatus for desalinating seawater according to claim 2, wherein the membrane, the fresh water enclosure, and the brine enclosure, are contained within a reverse osmosis system, and the reverse osmosis system is supported by a floatation device.

6. An apparatus for desalinating seawater according to claim 5, wherein there is a channel retained on the flotation device, and the reverse osmosis system is retained on the channel below the flotation device.

7. An apparatus for desalinating seawater according to claim 6, wherein the channel has at least one top opening, the brine enclosure has an outlet connected to the channel through which water having an increased concentration of salt can pass from the brine enclosure into the channel, and the inlet of the brine return is connected to the channel.

8. An apparatus for desalinating seawater according to claim 7, wherein the channel has no openings other than the top opening, an opening for the outlet of the brine enclosure, and an opening for the inlet of the brine return.

9. An apparatus for desalinating seawater according to claim 8, wherein the inlet has a screen and at least one filter through which seawater must pass before it can reach the membrane.

10. An apparatus for desalinating seawater according to claim 1, wherein there is a valve in the seawater inlet.

* * * * *